United States Patent
Chen et al.

(10) Patent No.: US 9,729,997 B2
(45) Date of Patent: Aug. 8, 2017

(54) MOBILE DEVICE SELF-PROVISIONING

(71) Applicant: CELLCO PARTNERSHIP, Basking Ridge, NJ (US)

(72) Inventors: Zhengfang Chen, Milburn, NJ (US); Mohammad Raheel Khalid, Budd Lake, NJ (US); Ji Hoon Kim, Lyndhurst, NJ (US); Masudur SM Rahman, Edison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 502 days.

(21) Appl. No.: 14/134,826

(22) Filed: Dec. 19, 2013

(65) Prior Publication Data

US 2015/0181364 A1 Jun. 25, 2015

(51) Int. Cl.
*H04Q 7/10* (2006.01)
*H04W 4/00* (2009.01)
*H04W 8/20* (2009.01)
*H04W 4/24* (2009.01)
*H04M 15/00* (2006.01)

(52) U.S. Cl.
CPC ........... *H04W 4/001* (2013.01); *H04W 8/205* (2013.01); *H04M 15/715* (2013.01); *H04M 15/72* (2013.01); *H04M 15/93* (2013.01); *H04W 4/24* (2013.01)

(58) Field of Classification Search
CPC ..... H04W 12/06; H04W 60/04; H04W 60/00; H04W 8/04; H04W 8/26

USPC .............................. 455/411, 407, 433, 435.1
See application file for complete search history.

(56) References Cited

U.S. PATENT DOCUMENTS

| 7,137,003 | B2 * | 11/2006 | Krishnan et al. ............. 713/172 |
| 8,515,421 | B2 * | 8/2013 | Shaheen et al. ........... 455/435.1 |
| 8,649,335 | B2 * | 2/2014 | Fan et al. ...................... 370/329 |
| 8,755,784 | B2 * | 6/2014 | Richardson et al. ......... 455/418 |
| 2007/0254711 | A1 * | 11/2007 | Young et al. ................. 455/558 |
| 2009/0061839 | A1 * | 3/2009 | Zimmerman et al. ........ 455/419 |
| 2011/0249658 | A1 * | 10/2011 | Wohlert et al. ............... 370/338 |
| 2013/0242727 | A1 * | 9/2013 | Shaikh .......................... 370/230 |

* cited by examiner

*Primary Examiner* — Ajit Patel
*Assistant Examiner* — Julio Perez

(57) ABSTRACT

Systems and methods for self-provisioning of mobile devices are disclosed. An implementation includes determining whether the SIM of a mobile device is associated with a wireless network provider, sending an attachment request to a wireless data network of the wireless network provider when the mobile device is within a coverage area of the wireless data network, receiving an attachment response from the wireless data network of the wireless network provider in response to the attachment request, determining from the attachment response, whether attachment to the wireless data network of the wireless network provider is successful, reviewing an error code provided by the wireless network provider and based on the error code, displaying a user interface allowing a user to provision the SIM for receiving service from the wireless network provider.

20 Claims, 8 Drawing Sheets

FIG. 3C

Mobile Broadband — 320

1. Select Your Data Allowance — 322

| Data Allowance | Access Charge | Expiration |
|---|---|---|
| 1 GB | $20.00 | Month |
| ✓ 2 GB | $30.00 | Month |
| 5 GB | $50.00 | Month |
| 10 GB | $80.00 | Month |

2. Create Your Profile
Account Information — 324

First Name* [ ]    Last Name* [ ]
Address Line 1* [Billing address]
Address Line 2 [ ]
City* [Billing city]
Zip Code* [Billing zip code]    State* [XX]    Phone* [Your contact phone number]

*Indicates required

---

CONNEC...  verizon

Network Settings

Status: Limited
Network Mode: LTE
APN: vzwinternet

Device Information

MOBILE DEVICE SELF-PROVISIONING

BACKGROUND

Mobile device provisioning is a process by which a mobile device and the mobile device's subscriber identification module (SIM) is associated with a wireless network provider's phone and data services. Once the mobile device is provisioned, the mobile device can proceed to receive services (e.g., wireless voice and data services) provided by the wireless network provider.

With increasing demand for mobile devices such as tablets and touch-screen phones, users frequently purchase their mobile devices from third-party vendors instead of wireless network providers. Such third-party vendors often sell mobile devices that have not been provisioned. To provision a mobile device and its SIM, so as to allow the mobile device to receive services provided by a wireless service provider, the user may walk into a wireless network provider's store and request assistance from staff. The staff would then have the user sign-up for a wireless service contract and subsequently have the mobile device provisioned. This process can take significant time and can be a tedious experience for the user. The process is almost equally time consuming even when the user chooses to call the wireless service provider's customer service number without travelling to the wireless service provider's store.

While there are certain mobile devices that allow a user to self-provision, such self-provisioning techniques are device specific, designed by the device manufacturer and cannot be applied to other devices sold or marketed by a wireless network provider. Furthermore, such device specific self-provisioning techniques consume significant wireless network bandwidth even before provisioning to check with the wireless network provider if the user of the device has a valid wireless account. Furthermore, such self-provisioning techniques are limited to working with new SIMs and fail to operate with previously used or expired SIMs that may be reused for a new wireless account.

As the foregoing illustrates, a new approach for mobile device provisioning may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3C illustrates another exemplary user interface for a wireless data provider registration portal;

DETAILED DESCRIPTION

Figure 1:
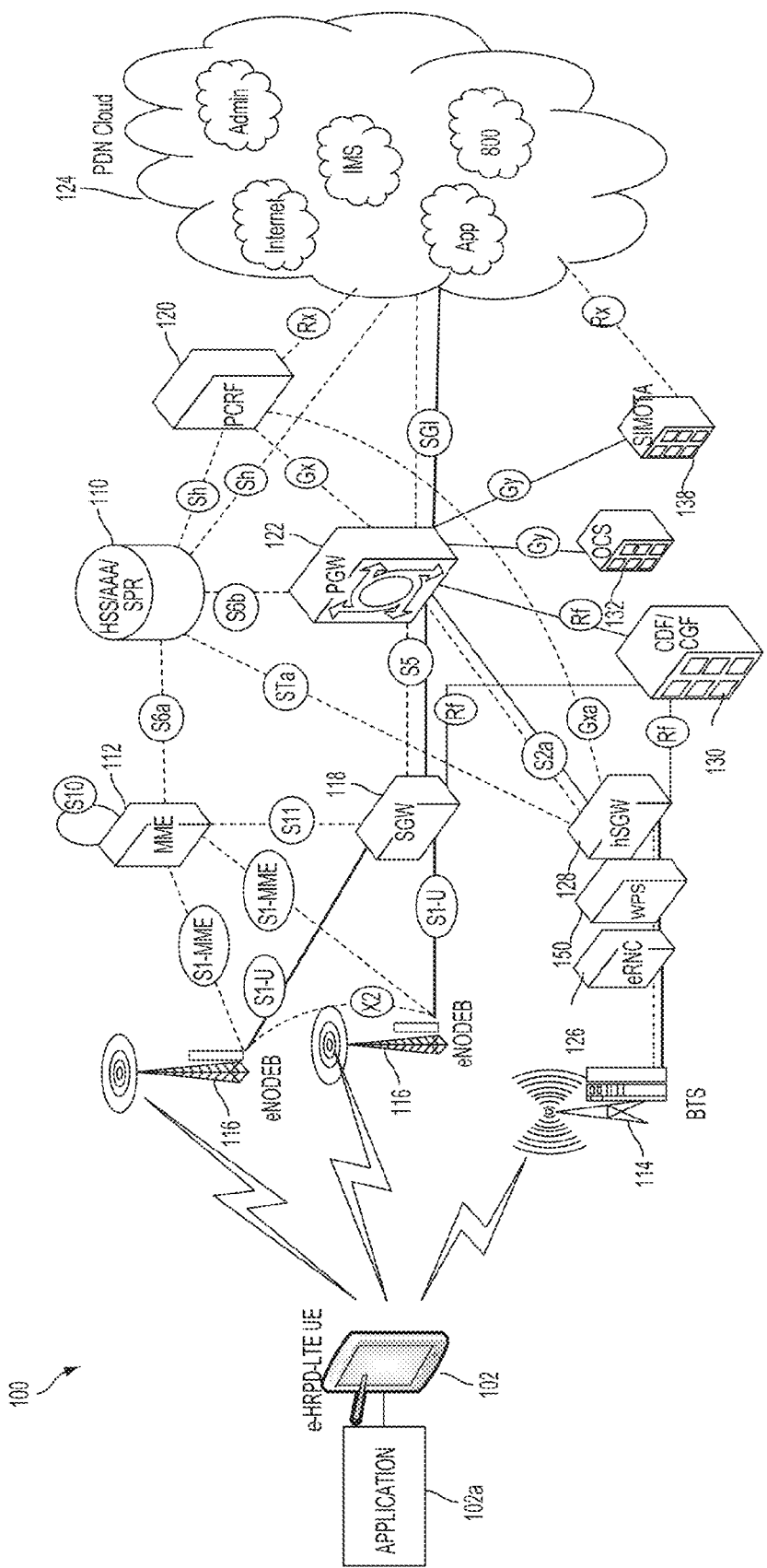
FIG. 1 illustrates a functional block diagram describing a network, which allows a user equipment (UE) self-provision to the network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to mobile device self-provisioning.

Mobile device provisioning is a process by which a mobile device and the mobile device's subscriber identification module (SIM) is associated with a wireless network provider's phone and data services. Once the mobile device is provisioned, the mobile device can proceed to receive services (e.g., wireless voice and data services) provided by the wireless network provider.

Among mobile devices available for sale to users, few devices (e.g., Apple iPad) include logic to allow a user to perform on-device self-provisioning and activate wireless services (e.g., Verizon data services) without requiring the user to visit a retail location or call a customer service agent. Such provisioning logic may check a Mobile Directory Number (MDN) on a SIM to determine a possibility of the SIM being un-provisioned. However such a determination may not be reliable as there may not be a valid correlation between a default MDN value (e.g., all 0s) and a SIM card being un-provisioned. Also, a SIM associated with an expired or canceled account may have a previously assigned and activated MDN on the SIM, however the device may not currently have a valid account with a wireless network provider. Furthermore, if a device having existing self-provisioning logic (e.g., Apple iPad) is powered up with an expired or "account canceled" SIM, the self-provisioning logic of the device may not work because the logic may not recognize an "account canceled" SIM as a SIM that is able to be provisioned.

The existing self-provisioning logic may also detrimentally add to network traffic. Particularly, a device such as an Apple iPad may need to perform Over The Air Parameter Administration (OTAPA) in a 2G network mode to identify whether the device has a valid wireless network provider account. This process may add traffic to the wireless network. As a result, when numerous devices across the network attempt to self-provision at substantially the same time, the network may be over-burdened. Moreover, because of its very nature, there is no indication to the network as to when excessive network usage due to self-provisioning may take place, and thus little chance that the network will be able to compensate for such an event.

Also, such self-provisioning logic may not be used across numerous devices. This is because the OTAPA network server can have limited device provisioning capacity or bandwidth. For example, the OTAPA server may have sufficient bandwidth to accommodate OTAPA requests from a specific device (e.g. Apple iPad), but no bandwidth to accommodate all other mobile devices reaching out to the OTAPA server at power up to identify whether the device has a valid wireless network provider account. In addition, such self-provisioning logic can require significant Original Equipment Manufacturer (OEM) software development and testing efforts to alter standard modem LTE network attachment and activation behavior. This can result in significant device test and certification costs.

The disclosed implementations for mobile device self-provisioning overcome the foregoing self-provisioning limitations.

In an implementation, power up of a mobile device equipped with a Subscriber Identification Module (SIM) is detected. It is then determined whether the SIM of the mobile device is associated with a wireless network provider. Upon determining the SIM of the mobile device is associated with the wireless network provider, an attachment request is sent to a wireless data network of the wireless network provider when the mobile device is within a coverage area of the wireless data network. Responsive to the attachment request, an attachment response is received from the wireless data network of the wireless network provider at the mobile device. Based on the attachment response, it is determined whether an attachment to the wireless data network of the wireless network provider is successful. Upon determining the attachment is not successful, an error code provided by the wireless network provider is reviewed. Based on the error code, a user interface is displayed on the mobile device to obtain user permission to proceed with registration for wireless data services provided by the wireless network provider. Upon receipt of permission to proceed with the registration and if the mobile device is connected to a WiFi network, a registration web portal is displayed at the mobile device. The registration web portal allows a user to provision the mobile device and register for the wireless data services for the mobile device.

Reference now is made in detail to the examples illustrated in the accompanying drawings and discussed below. FIG. 1 is a functional block diagram describing a network 100 allowing user equipment (UE) to self-provision in accordance with the implementations. The network 100 may have all of the features, hardware, and systems of other networks, however, in this example, only the relevant portions of the network are described. The network 100 can have a Home Subscriber Server (HSS) 110. The HSS 110 evolved from a Home Location Register (HLR). In 3GPP networks, and particularly in the LTE architecture (for 3G and 4G networks), the HSS 110 can be a database of user (subscriber) information, i.e., customer profiles. The user information may include account information, account status, user preferences, features subscribed to by the user, user's current location and a SIM's International Mobile Subscriber Identity Number (IMSI) associated with the account. In roaming scenarios, the HSS 110 in the network 100 provides the user profile to a Mobility Management Entity (MME) 112.

The MME 112 is a control-node for the LTE access-network, in that it can be a single point (or "node") within the network that integrates numerous core functions and control over network flow, load sharing, etc. It can be responsible for tracking, paging, and retransmission procedures to the UE 102. The MME 112 can also be involved in the UE's activation/deactivation of service flows (also known as bearers) and is also responsible for authenticating the UE 102 when it is roaming, by interacting with the HSS 110. The UE 102 through the base station (BTS) 114 or one of the eNodeBs 116 and the Serving Gateway (SGW) 118, and MME 112, registers and authenticates with the network 100. The network 100 includes LTE servers such as, for example, Policy Control and Charging Rules Function (PCRF) 120, MME 112, PDN Gateway (PGW) 122, and the SGW 118. The network 100 also includes PDN servers located in the PDN cloud 124. The PDN cloud 124 may include one or more of the followings servers: IP Multimedia System (IMS) PDN, admin PDN, Internet PDN, content filtering PDN, enterprise PDN, app PDN, and 800 PDN. The authentication procedure between the UE 102 and the MME 112 can involve multiple messages per current 3GPP standards (Authentication Request/Response, Security Mode Command/Complete, etc).

The HSS 110 communicates with the MME 112 using an S6a protocol. The communication between HSS 110 and the MME 112 may traverse zero, one, or multiple diameter proxies. In the illustrated example, the communication occurs through no diameter proxies. The diameter proxy is a border gateway for the diameter protocol. The diameter protocol is a next generation Authentication, Authorization, and Accounting (AAA) protocol for IP communication networks. The protocol facilitates the exchange of AAA related information within the network. A more complete description of the diameter protocol can be found in a Request for Comments (RFC) 3588 (as published by the Internet Society, September 2003—which can be found at http://www.ietf.org/rfc/rfc3588.txt) which is incorporated herein by reference in its entirety. The S6a protocol enables transfer of profile and authentication data for authenticating/authorizing user access between the HSS 110 and the MME 112. The MME 112 can be responsible for a number of tasks, as noted above.

The PCRF 120 is configured to specify the QoS for the bearer based on a QoS Class Identifier (QCI) and ensures such specification is in accordance with the user's subscription profile stored on the HSS 110. The subscriber profile may include information about the subscriber. The information may include, for example, the MDN associated with the UE 102 and the various services subscribed to by the subscriber. The subscriber profile on the HSS 110 may also include information about which APNs the UE 102 is allowed to access. The APNs may include Internet APN, the vzw800 APN, the vzwapp APN, the vzwims APN, and/or the vzwadmin APN.

When the UE 102 setups data connection with each PDN, such as IMS PDN and/or Internet PDN, a data session may be created. Each data session may have one default bearer. Each bearer may be associated with one QCI. For example, when the UE 102 is connected to the Internet PDN and 800 PDN, two data sessions are setup. Each data session has one default bearer. Each default bearer is assigned to one QCI. Based on the subscriber profile, the PCRF 120 may determine the QCI that default bearer may use and then pass this information to the PGW 122 during the data session setup. The PGW 122 may then setup the data session and default bearer with the proper QCI. The PGW 122 is configured to assign IP addresses to the UE 102. The PGW 122 is also responsible for QoS enforcement based on the specified QoS by the PCRF 120. The SGW 118 is configured to receive the user's IP packets. The SGW 112 is also configured to serve as a mobility anchor for the bearers when the UE 102 moves from one eNodeB 116 to another. In the illustrated example, the MME 112 also communicates with the base station/antenna 114 to receive information and requests information from the UE 102. The UE 102 may be configured to include a browser application 102a. The software provisioning application 102a may display a user registration page to allow a user to register for wireless data services.

The UE 102 may be a 3G device with a 4G network capability or a 4G device. The 4G device can communicate with the PGW 122 through the eNodeB 116 and SGW 118. The 3G device with the 4G network capability can communicate with the PGW 122 through the BTS 114, the enhanced Radio Network Controller (eRNC) 126, and the High Rate Packet Data (HRPD) serving gateway (hSGW) 128. The BTS 114 receives the radio signals from the UE 102 and passes it to the eRNC 126 which will forward the signals to the hSGW 128. The functionality of the hSGW 128 is similar to that of SGW 118 except the hSGW 128 also acts as an interface between the 3G network and the 4G network.

In some implementations, software provisioning application 102a executing on the UE 102 may perform one or more operations related to self-provisioning. As an example, such an application may be known as a Mobile Broadband Account Experience (MBAE) application. The MBAE application can, for example, operate on a Windows mobile operating system platform. The provisioning application 102a may identify whether a SIM of UE 102 is associated with a particular wireless network provider (e.g., Verizon Wireless). Such identification may be based on the first six digits of an International Mobile Subscriber Identity Number (IMSI) associated with the SIM. If the SIM is determined to be associated with the particular wireless network provider, the provisioning application 102a may proceed to send a message to network 100 to request attachment to network 102. The message requesting attachment to network 102 may be sent from UE 102 to PGW 122 through the eNodeB 116 and SGW 118. Upon receipt of the attachment request, the PGW 122 communicates with the HSS 110 to determine whether the SIM is provisioned with a valid account with network 100. When HSS 110 indicates that the SIM is provisioned with a valid account, PGW 122 provides a request to SIM Over The Air Activation Server (SIMOTA) 138 to activate the SIM for use on network 100. Once the SIM is activated by the SIMOTA 138, the SIMOTA 138 may provide a response message to PGW 122 indicating whether the attachment of the SIM to network 100 is successful. The response message may be forwarded by PGW 122 to the UE 102. Based on the response message, application 102a can determine whether the attachment request has been successful. An exemplary attachment process is discussed further below with respect to FIGS. 4A and 4B.

When UE 102 has a valid account with network 100, the attachment request to network 100 may be successful and UE 102 may proceed to receive data and other services from network 100. However, if the attachment request is rejected with a particular Evolved Packet System Mobility Management (EMM) cause code provided by MME 112, provisioning application 102a may determine that UE 102 does not have a valid account (or is not provisioned) with network 100. The application 102a may then display a prompt on a user interface of application 102a. The prompt may ask the user to purchase a data service plan for use with network 100. When the user provides an indication to proceed with the purchase of a data service plan, application 102a may utilize an existing Wi-Fi connection of UE 102 to launch a wireless network provider's broadband registration portal. The registration portal may be provided to UE 102 by a web portal server (WPS) 150 that interfaces with HSS 110. The WPS 150 can retrieve UE 102 parameters including an international mobile equipment identity (IMEI) of UE 102 and an international mobile subscriber identity number (IMSI) of the SIM. The WPS 102 may validate the IMEI and IMSI with the HSS 110 by determining whether the IMEI and IMSI exist within a subscriber database of the HSS 110.

If the IMEI and IMSI exist within the subscriber database of the HSS 110, the WPS 150 may determine that the user has a pre-existing account with the wireless network provider. If the user has a pre-existing account with the wireless network provider, then the WPS 150 can provide a user login form for display at the registration portal. The login form allows the user to sign in into the user's account with the wireless network provider and purchase or modify the user's data service plan.

If the IMEI and IMSI do not exist within the subscriber database of the HSS 110, the user may not have a pre-existing account with the wireless network provider. In this scenario, if the IMEI is determined by WPS 150 to be associated with hardware of the wireless network provider, and the IMSI is within a valid range of IMSI numbers associated with the wireless network provider, the wireless network provider's broadband registration portal can allow the user to create an account with network 100 and purchase a data plan. If a Wi-Fi connection is not available, application 102a may remind the user to connect to a Wi-Fi network at a later time to complete the data plan purchase. In some implementations, once a data plan purchase is completed, the WPS 150 may add the IMEI and IMSI of UE 102 to a subscriber database of HSS 110. An exemplary registration process is discussed further below with respect to FIG. 2.

Moving forward, the operator (or user) of the UE 102 may be charged based on a post-pay mechanism or a pre-paid mechanism. In the post-pay mechanism, the customer is allowed to use the data network 100 first and pay for such usage later, for example, on a monthly basis. To this end, the network elements (e.g., SGW 118, hSGW 128, PGW 122) gather information about the customer's monthly data usage and forward the record to CDF 130. The CDF 130 formats this data usage records and sends it to the IT system of the mobile communication network provider to generate a billing statement for the customer based on this data usage record. Once the billing statement is generated, it may be associated with the customer's account on the HSS 110.

In the pre-paid mechanism, the customer may be charged in real-time against a pre-paid deposit. For example, a pre-paid customer may have to deposit $100 in his/her account before being granted access to the data network 100. Once the customer's $100 in the account is exhausted, the customer's access to the network 100 is essentially denied until the customer recharges its account. The pre-paid mechanism is supported by the OCS 132, which is a real-time charging system. The PGW 122 is configured to monitor the data usage. When the customer launches a new data session, the PGW 122 sends a request to the OCS 132 to validate the customer. If the customer is valid, and has money/credit not expired for usage in accordance with a usage plan, the OCS 132 grants usage allowance. For example, the OCS 132 grants a specific Mega Bytes (MB) usage allowance and returns this granted usage allowance to the PGW 122. In response, the PGW 122 allows the customer to use the data network and start monitoring the data usage. Once the granted usage allowance is used up, the PGW 122 sends another request to the OCS 132 to ask for an additional usage allowance. If the customer is out-of-credit, the OCS 132 denies the additional usage allowance. The PGW 122 may maintain the data session, and stop the customer from access to the Internet by dropping the out-going data packets.

On the UE 102 side, the UE 102 may not know the customer is out-of-credit. Therefore, the applications on the UE 102 may still attempt to send data packets since data session is still up. Based on the current operating system (OS) logic, when there is no incoming acknowledgement being received for the out-going data packets, after a certain time period, the OS resets the radio channel (e.g., terminates the existing data session and establishes a new one). The PGW 122 knows if the granted usage allowance or data quota assigned to this user by the OCS 132 is used up. Once granted usage allowance is used up, the PGW 122 reports the used usage allowance and sends a request to the OCS 132 to ask for a new granted usage allowance or data quota. The OCS 132 charges the used usage allowance reported by the PGW 122 to the customer account, and then determines if the customer has enough money/credit to grant the next data quota.

For example, assume the customer has 1 GB on his/her account, the PGW 122 requests from the OCS 132 a quota for the device associated with the customer. The OCS 132 returns with granted usage allowance of, for example, 100 MB. The PGW 122 may then allow the customer access to the Internet. The PGW 122 monitors if the 100 MB has been depleted. If yes, the PGW 122 reports the used usage allowance of 100 MB to the OCS 132 and then sends a request for a new quota. The OCS 132 updates the customer account from 1 GB to 900 MB, and then assigns a new granted usage allowance of 100 MB to the PGW 122.

The UE 102 is shown to be a smart-phone but can take other forms. For example, the UE 102 can take the form of portable handsets, tablets and personal digital assistants, although they may be implemented in other form factors. Program applications, including the provisioning application 102*a* for self-provisioning UE 102 can be configured to execute on many different types of mobile devices. For example, a mobile station application can be written to execute on a binary runtime environment for mobile (BREW-based) mobile station, a Windows Mobile based mobile station, Android, iPhone, Java Mobile, or RIM based mobile station such as a BlackBerry or the like. Some of these types of devices can employ a multi-tasking operating system.

Figure 2:
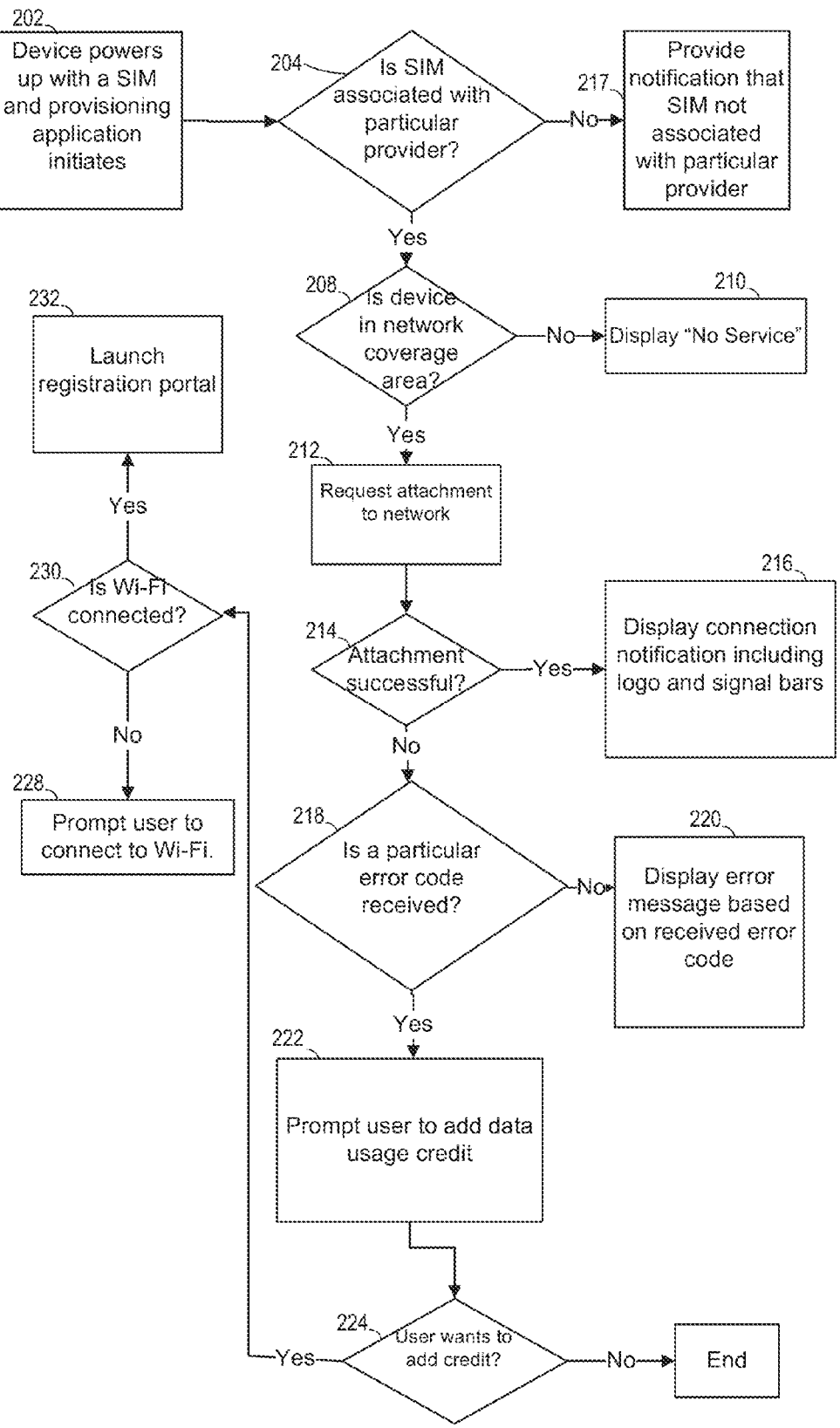
FIG. 2 illustrates an exemplary process for self-provisioning the UE to the network shown in FIG. 1.

FIG. 2 is a flowchart illustrating an exemplary self-provisioning process, according to an implementation. The exemplary self-provisioning process 200 begins with a device powering up and a provisioning application initiating operation (step 202). As an example UE 102 may power up and provisioning application 102*a* may initiate operation when a user selects a "Power" button on UE 102.

Upon device power-up, provisioning application 102*a* can determine whether a SIM of UE 102 is associated with a particular wireless network provider (step 204). Such determination may include checking whether the first six digits of an IMSI associated with the SIM match those of the particular wireless network provider (e.g., Verizon Wireless). For example, the provisioning application 102*a* may check a database that includes associations between the first six digits of an IMSI with names or identifiers representing wireless network providers. The provisioning application 102*a* may review this database to determine whether first six digits of an IMSI are associated with a particular wireless network provider.

If the SIM of the device is not associated with the particular wireless network provider (step 204, No), then the self-provisioning process 200 may provide a notification to the user via UE 102 that the SIM is not associated with the particular wireless network provider (step 217). If the SIM is determined to be associated with the particular wireless network provider (step 204, Yes), then it is determined whether the device is in connectivity range of a network of the wireless network provider (step 208). As an example, provisioning application 102*a* may determine if the UE 102 is within wireless connectivity range of a 4G LTE network (e.g., Verizon 4G LTE network).

If the device is not within range of the network of the wireless network provider (step 208, No), then an indication of non-availability of network services is displayed on the device (step 210). As an example, provisioning application 102*a* may cause display of "No Service" on a user interface displayed on the UE 102. If the device is within range of the network of the wireless network provider (step 208, Yes), a network attachment process is initiated by sending an attachment request to the network 100 (step 212). As an example, the provisioning application 102*a* may proceed to send a message to network 100 to request attachment to network 100. As discussed above, the attachment request may be sent from UE 102 to PGW 122 through the eNodeB 116 and SGW 118. Upon receipt of the attachment request, the PGW 122 communicates with the HSS 110 to determine whether the SIM is provisioned with a valid account with network 100. When HSS 110 indicates that the SIM is provisioned with a valid account, PGW 122 provides a request to SIMOTA 138 to activate the SIM for use on network 100.

Returning to self-provisioning process 200, after an attachment request is provided in step 212, it is determined whether the attachment request is successful (step 214). For example, once the SIM is activated, the SIMOTA 138 may provide a response message to indicate whether the attachment of the SIM to network 100 is successful. The response message may be received by provisioning application 102*a* to determine whether the attachment request has been successful.

If the attachment is successful, an indication may be provided on the user interface of the device (step 216). If the attachment is not successful, (step 214, No), then it is determined whether an error code in the response message is a particular error code (step 218). As an illustrative example, provisioning application 102*a* may determine whether the particular error code indicates that evolved packet system (EPS) and non-EPS services are unavailable (e.g., EMM code 8).

If the error code is not the particular error code (step 218, No) another error message provided by SIMOTA 138 may be displayed at the device (step 220). If the error code is the particular error code (step 218, Yes), a prompt indicating that the user has no data usage balance, and requesting the user to add monetary credit to the user's data service account with the wireless network provider (or "recharge the account"), is displayed to the user (step 222). As an example, the message may indicate "You have $0 data balance or reached data usage, tap here to purchase data."

Process 200 then determines whether the user has provided an indication to recharge the user's data services account (step 224). If the user has provided an indication not to recharge the user's data services account (step 224, No), process 200 ends. If the user has provided an indication to recharge the user's data services account (step 224, Yes), it is determined whether the device is connected to a WiFi network (or any other broadband network) (step 230).

If the device is connected to a WiFi network (step 230, Yes), then a data plan registration portal is displayed at the device (step 232). As an example, provisioning application 102*a* may utilize an existing Wi-Fi connection of UE 102 to launch a wireless network provider's broadband registration portal in a web browser of UE 102. The wireless network provider's broadband registration portal at UE 102 can allow the user to purchase a data plan.

Also, as discussed above, the registration portal may be provided to UE 102 by a WPS 150 that can interface with HSS 110. The WPS 150 can retrieve from UE 102 parameters including an IMEI of UE 102 and an IMSI of a SIM of UE 102. The WPS 102 may validate the IMEI and IMSI with the HSS 110 to determine whether the IMEI and IMSI exist within a subscriber database of the HSS 110. If the IMEI and IMSI exist within the subscriber database of the HSS 110, the WPS 150 may determine that the user has a pre-existing account with the wireless network provider. If the user has a pre-existing account with the wireless network provider, then the WPS 150 can provide a user login form for display at the registration portal. The login form allows the user to sign into the user's account with the wireless network provider and purchase or modify the user's data service plan. If the IMEI and IMSI do not exist within the subscriber database of the HSS 110, the user may not have a pre-existing account with the wireless network provider. In this scenario, if the IMEI is determined by WPS 150 to be associated with hardware of the wireless network provider, and the IMSI is within a valid range of IMSI numbers associated with the wireless network provider, the wireless network provider's broadband registration portal can allow the user to create an account with network 100 and purchase a data plan.

Returning to process 200, if the device is not connected to a WiFi network (step 230, No), a prompt requesting that the user connect to a WiFi network is displayed at the device (step 228). As an example, when the user later connects to a WiFi network, the registration portal may be automatically displayed to the user.

Figure 3A:
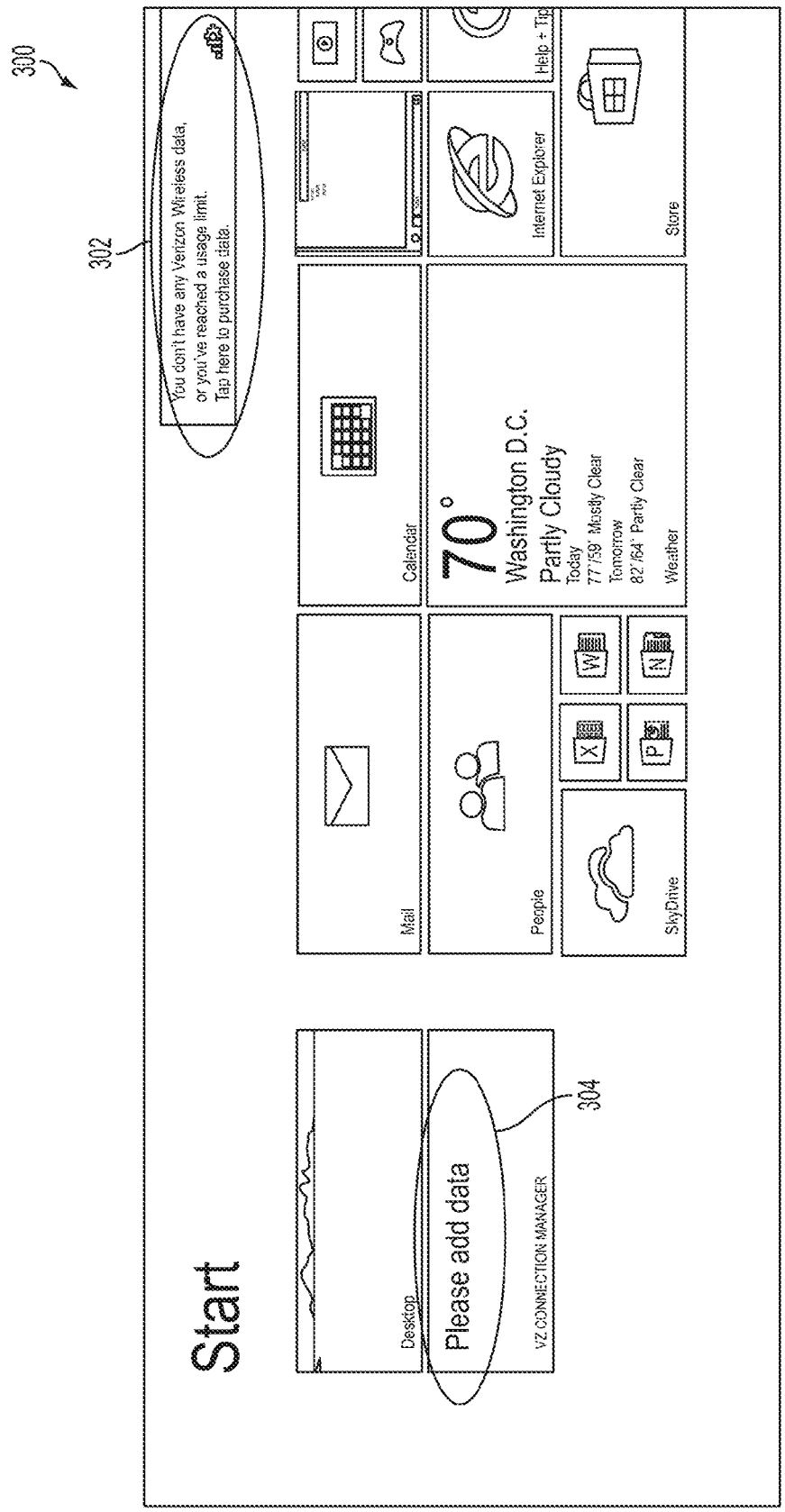
FIG. 3A illustrates an exemplary user interface to initiate addition of a wireless data plan for the UE shown in FIG. 1.

FIG. 3A illustrates an exemplary user interface 300 of UE 102 that may be displayed upon start-up or power-up of UE 102. User interface 300 can display notification 302 indicating that a user has reached a data usage limit and requesting that the user recharge the user's data plan. The notification 302 may be displayed using a color, font size, font type (or any other display parameter) that is different from corresponding user interface parameters of user interface 300. In this way, the notification may "stand-out" from the rest of the user interface 300 and may be easily viewed by the user. User interface may also display another notification 304 that also requests the user to "Add Data" to enable data services with a wireless network provider. As an example, notifications 302 and 304 may be displayed at step 222 of process 200 of FIG. 2. Notifications 302 and 304 may be generated by provisioning application 120a.

Figure 3B:
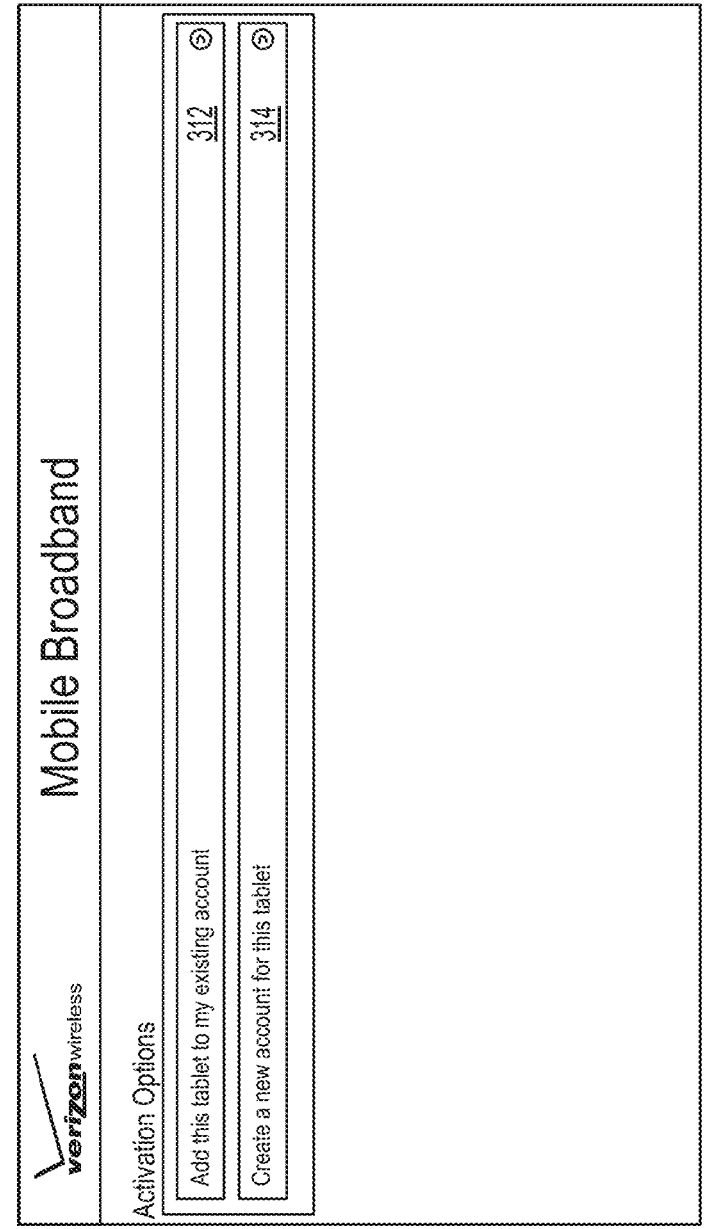
FIG. 3B illustrates an exemplary user interface for a wireless data provider registration portal.
Figure 3B:
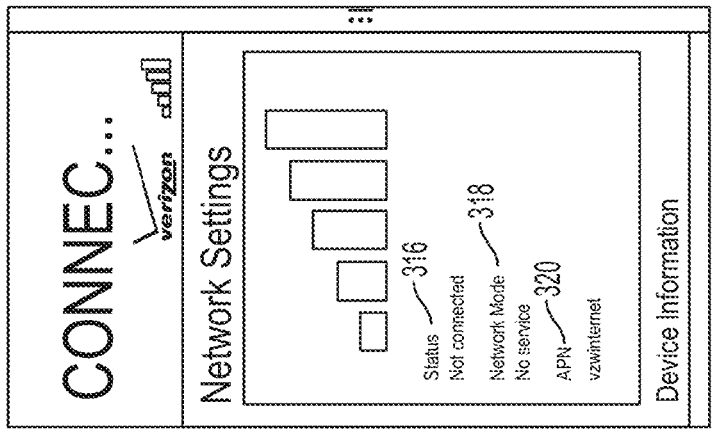

FIG. 3B illustrates an exemplary portal 310 that may allow a user to self-provision UE 102. Portal 310 may be generated by provisioning application 120a. Portal 310 may also be generated by the wireless network provider and displayed at UE 102. As an example, portal 310 may be displayed when the user selects notification 302 of user interface 300. In another example, portal 310 may be displayed at step 232 of process 200 where a data plan registration portal is displayed at the device. Portal 310 allows the user to add (or provision) UE 102 to the user's existing account with a wireless network provider using user interface element 312. If the user does not have an existing account with the wireless network provider, portal 310 allows the user to create a new account with the wireless network provider using user interface element 314. In addition, portal 310 may display an indication 316 of whether UE 102 is connected to a WiFi network, a network mode 318 and an Access Point Name (APN) 320.

FIG. 3C illustrates an exemplary portal 320 that displays data plan options 322 and allows the user to subscribe to a data plan. As illustrated in portal 320, the user may be allowed to select a data allowance (e.g., 1 GB, 2 GB, etc.). The data allowance may be associated with an access charge and an expiration duration. The expiration duration may indicate an amount of time within which the user may need to use a selected data allowance. In addition to data plan options 320, the user may be asked to provide user contact information 324 including the user's name and address information. Such information may be needed for billing purposes by the wireless network provider.

Provisioning application 120a provides several benefits. For example, users need not spend time committing themselves to annual or long term wireless data contracts when they purchase a mobile device. Instead, users are able to sign-up and expeditiously benefit from wireless data services at any time using provisioning application 120a and without having to visit a retail location of a wireless network provider, or even talk to a customer service representative via phone.

Another benefit includes the use of a particular error code (e.g., EMM #8) to determine whether a SIM card is provisioned with a network. Such an error code may uniquely and reliably identify whether a mobile device does or does not have a valid account with the network. Furthermore, such a provisioning approach can work with devices having expired or "account canceled" SIMs.

Provisioning application 120a allows a modem of UE 102 to power up with a standard 4G LTE network attach procedure and may not require switching of UE 102's modem to various network modes (e.g., 2G modes). Thus, deployment of provisioning application 102a may need less device OEM development and integration efforts. Provisioning application 120a allows for provisioning with both new (and previously unused) and un-provisioned SIMs. Provisioning application 120a also allows for provisioning with a previously used SIM. Such a used SIM may have been previously activated with an account that may be now expired or canceled. Provisioning application 120a can utilize an existing WiFi network as a data connection to launch a registration portal (e.g., portal 302). Use of an existing WiFi network to connect to the registration portal minimizes the use wireless data network resources. Provisioning application 120a may not be device specific and can be re-used by any mobile device operating system platform, including but not limited to, Android and Blackberry.

Use of provisioning application 120a is beneficial to both a mobile device user and a wireless network provider. Mobile device users benefit because they are able to self-provision mobile devices with less time and effort. Furthermore, users also can have more flexibility to sign up with a wireless network provider via any mobile device regardless of a device's operational system platform. From a wireless network provider's perspective, because devices can be conveniently self-provisioned by users, the wireless network provider needs to provide less customer service time and resources to service the user. A convenient self-provisioning process enhances user experience and can lead to more data subscriptions and increased data usage revenue for the wireless network provider.

Figure 4A:
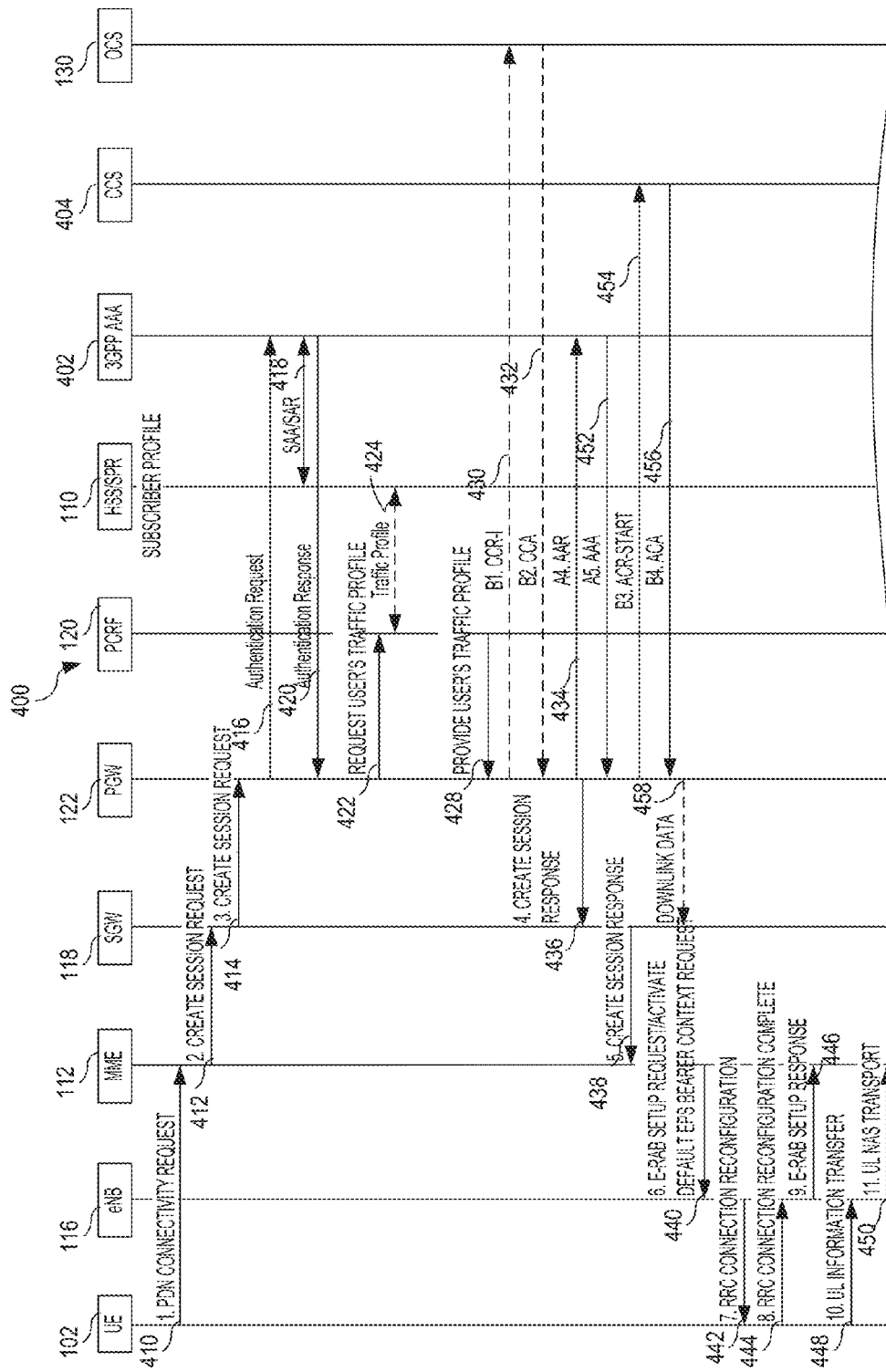
FIGS. 4A-4B illustrate an exemplary attachment process for establishing a data connection between the UE and the network shown in FIG. 1.
Figure 4B:
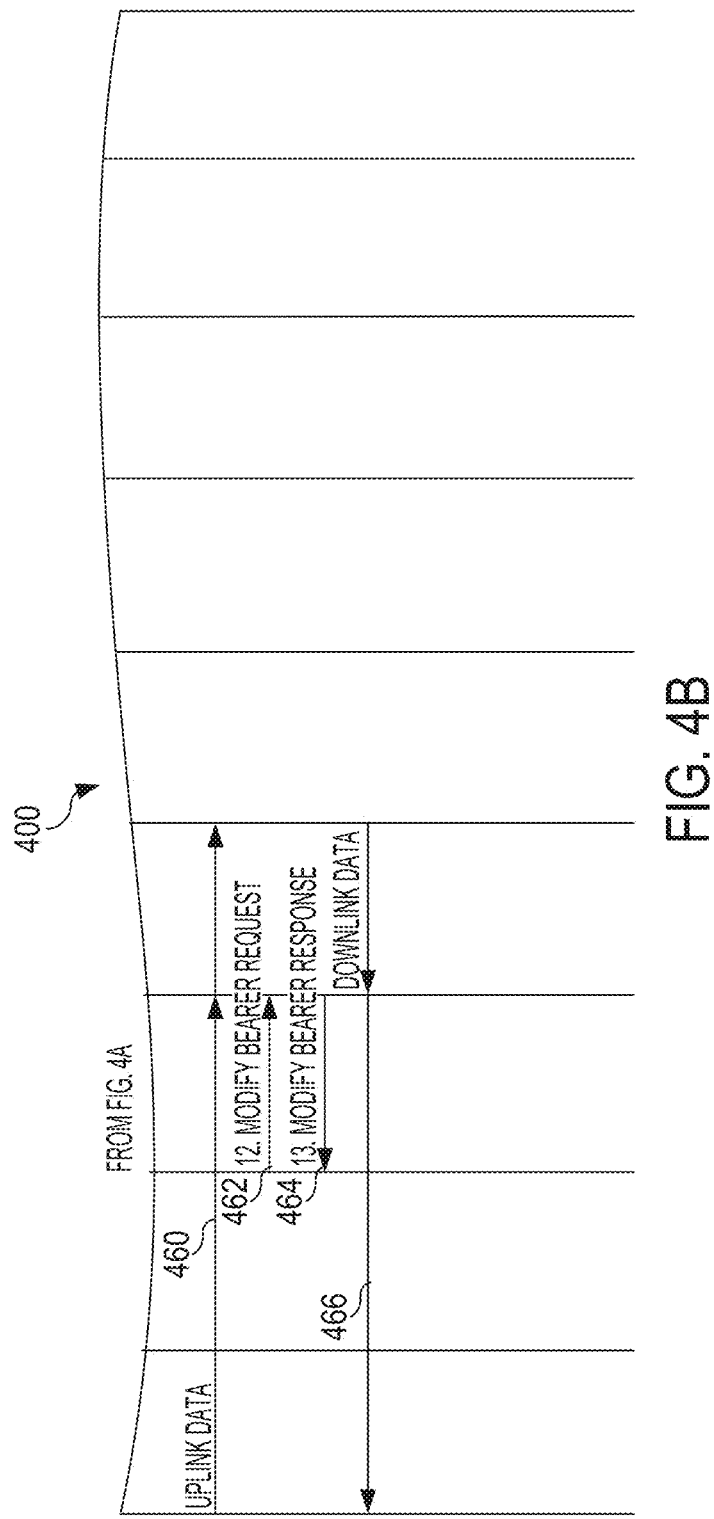

FIGS. 4A-4B illustrate an exemplary attachment process 400 for establishing a data connection between the UE 102 and the network 100. Referring to FIG. 1, upon receipt of an attachment request, the PGW 122 communicates with the HSS 110 to determine whether the SIM is provisioned with a valid account with network 100. When HSS 110 indicates that the SIM is provisioned with a valid account, PGW 122 provides a request to SIM Over The Air Activation Server (SIMOTA) 138 to activate the SIM for use on network 100. Once the SIM is activated by the SIMOTA 138, the SIMOTA 138 may provide a response message to PGW 122 indicating whether the attachment of the SIM to network 100 is successful. The response message may be forwarded by PGW 122 to the UE 102. Based on the response message, application 102a can determine whether the attachment request has been successful.

The elements performing the various steps of the attachment process 400 include UE 102, eNB 116, MME 112, SGW 118, PGW 122, PCRF 120, HSS 110, and OCS 130. These elements are similar to those shown in FIG. 1. Therefore, for the sake of brevity of description and simplicity, they are not described here in more detail. The process 400 also involves AAA 402 and CCF 404. The AAA 402 authenticates the PDN connection requests received from the UE 102. For example, the AAA 402 determines whether the UE 102 is authorized to request a specific APN connection. The CCF 404 acts as a counter and keeps track of the data usage associated with different data connections between the UE 102 and the network 100.

The process 400 begins with the UE 102 initiating a new PDN connection request to the MME 112 via the eNB 116 (Step 410). The PDN connection request may specify the type of the APN associated with the PDN data connection. The APN associated with the data connection may correspond to the default APN, the vzw800 APN, the vzwapp APN, the vzwims APN, or the vzwadmin APN. The MME 112 receives the connection request and in response sends a Create Session Request message to the SGW 118 (Step 412). The SGW 118 forwards the Create Session Request message to the PGW 122 (Step 414). The MME's 112 selection of the SGW 118 and the PGW 122 depends on configuration parameters specified in the PDN connection request. For example, the MME 112 may select the SGW 118 and the PGW 122 based on the APN specified in the connection request. Specifically, the MME 112 identifies the PGW 122 that provides the specified APN connectivity and that is closest to the subscriber location. Based on the identified PGW 122, the MME 112 selects the SGW 118.

The PGW 122 receives the Create Session Request message and performs authentication before creating a session and providing the UE 102 with a session response. To this end, the PGW 122 sends an authentication request to the AAA server 402 (Step 416). The authentication request may seek to authenticate the user's request to establish the vzw800 APN connection. The AAA server 402 may authenticate the user's access request based on its internal record and/or based on interacting with the HSS 110 (Step 418). In either case, the AAA server 402 sends the authentication result to the PGW 122 (Step 420). Assuming the user is authorized to access the vzw800 APN, the PGW 122 then determines the traffic profile for the user by sending IP-CAN Session Establishment Procedure message to the PCRF 120 (Step 422). If the PCRF 120 does not have the user's traffic profile, the PCRF downloads user's traffic profile from the HSS 110 (Step 424). If there is no subscription to profile update notification for the user, the PCRF 120 may subscribe to profile update notification. The user's traffic profile may specify whether the user is a pre-paid customer or a post-pay customer and the speed rate associated with the UE 102. The PCRF 120 forwards the user's traffic profile to the PGW 122 (Step 428).

The PGW 122 determines whether the user is a pre-paid customer or a post-pay customer based on the user's traffic profile. If the user is a pre-paid customer, the PGW 122 will check with the OCS 130 to determine whether the user has sufficient funds available for establishing the PDN data connection (Step 430). The OCS 130 provides the PGW 122 with a response regarding the sufficiency of the user's funds for establishing the PDN data connection (Step 432). If the user does not have sufficient funds and the user is a pre-paid customer, the PGW 122 denies the session request and informs the user of the same. If the user has sufficient funds or the user is a post-pay customer, the PGW 122 sends a Create Session Response message to the SGW 118 (Step 436). The Create Session Response message includes an IP address for the PDN data connection. The PGW 122 also sends an AAR message to the AAA server 402 informing the AAA server 402 of the IP address that is being assigned to the UE 102 (Step 434). The AAA server 402 responds with AAA message (452) confirming receipt and providing session ID and result code. After the PDN session establishment is complete, the PGW 122 sends an ACR-Start message to the CCF 404 (Step 454). The CCF 404 responds with an ACA message to the PGW 122 (Step 456). The start message indicates to the CCF 404 to start the timer associated with this data session. The PGW 122 also sends a downlink data to the SGW 118 (Step 458) informing the SGW 118 that the network 100 is ready to accept and download data to the UE 102.

The SGW 118 forwards the Create Session Response message to the MME 112 (Step 438), which will forward E-RAB Setup Request message to the eNB 116 (Step 440). In response, the eNB 116 sends an RPC Connection Reconfiguration message to the UE 102 (Step 442). The RPC Connection Reconfiguration message assigns the IP address to the UE 102 and provides the UE 102 with the radio bearer identity of the eNB 116 for communication with the network 100. The UE 102 informs the eNB 116 that it has completed configuration by sending an RPC Connection Reconfiguration Complete message to the eNB 116 (Step 444). In response, the eNB 116 forwards an E-RAB Setup Response message to the MME 112 (Step 446). The E-RAB Setup Response message indicates to the MME 112 that the UE 102 is in connected mode and can communicate with the network 100. Thereafter, the UE 102 sends to the eNB 116 a UL Information Transfer message (Step 448). The UL Information Transfer message informs the network 100 that the UE 102 is ready to upload data to the network 100. In response, the eNB 116 forwards UL NAS Transport message to the MME 112 (Step 450).

The MME 112 sends a Modify Bearer Request message to the SGW 118 (Step 462). The Modify Bearer Request message informs the SGW 118 of the name of eNB 116 serving the UE 102. The SGW 118 notes the eNB's 116 name and responds back to the MME 112 with a Modify Bearer Response (Step 464). From this point forward, the data communication may happen directly between the UE 102 and the PGW 122 without having to go to the MME 112. Therefore, when the customer uploads data (e.g., pictures) or downloads data from the Internet, the data will not go through the MME 112.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for allowing mobile device self-provisioning. The software code is executable by the general-purpose computer that functions as the PGW 122. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for mobile device self-provisioning, in essentially the manner performed in the implementations discussed and illustrated herein.

Figure 5:
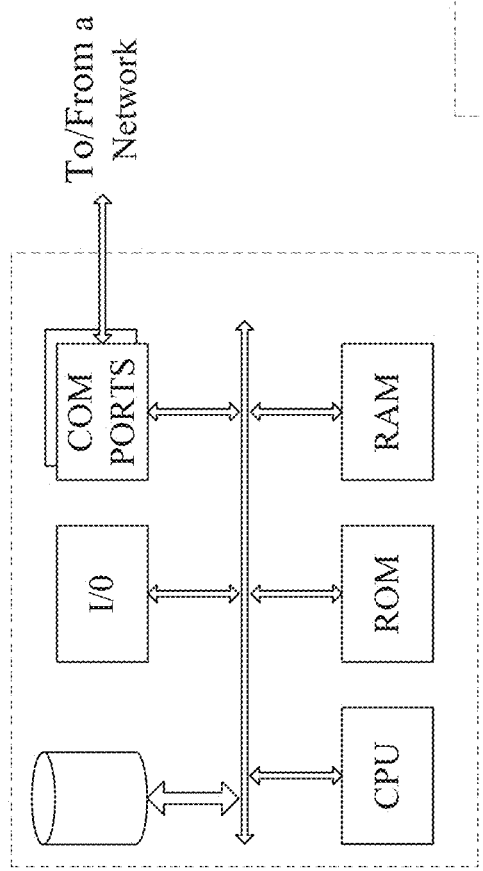
FIG. 5 is a simplified functional block diagram of a computer that may be configured to function as any of the devices of FIG. 1.
Figure 6:
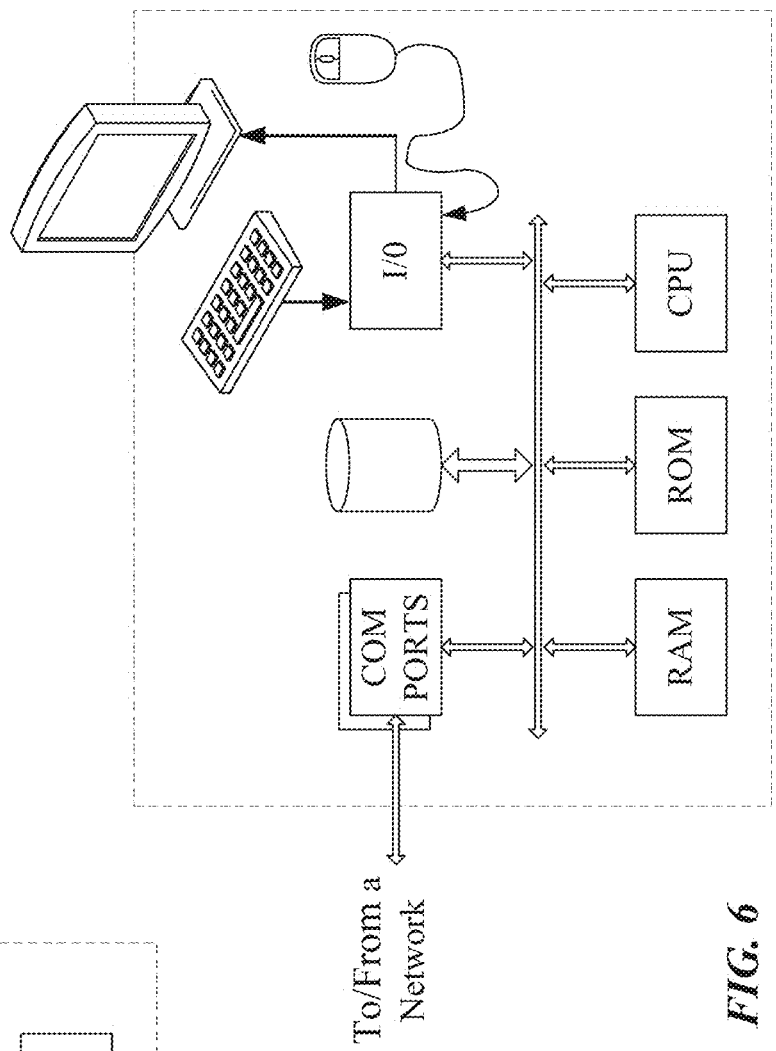
FIG. 6 is a simplified functional block diagram of a personal computer or other work station or terminal device that may be configured to function as any of the devices of FIG. 1.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of providing multiple APN connections support outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the communication network provider into the computer platform of the UE 102. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the multiple APN connections support on the web browser shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting power up of a mobile device equipped with a Subscriber Identification Module (SIM);
   determining whether the SIM of the mobile device is associated with a wireless network provider;
   upon determining the SIM of the mobile device is associated with the wireless network provider, sending an attachment request to a wireless data network of the wireless network provider when the mobile device is within a coverage area of the wireless data network;
   receiving an attachment response from the wireless data network of the wireless network provider in response to the attachment request;
   determining from the attachment response, whether attachment to the wireless data network of the wireless network provider is successful;
   upon determining the attachment is not successful, reviewing an error code provided by the wireless network provider;
   based on the error code, determining whether the SIM is not provisioned for receiving service from the wireless network provider;
   upon determining the SIM is not provisioned for receiving service from the wireless network provider, determining if the mobile device is connected to a Wi-Fi network; and
   upon determining the mobile device is connected to the Wi-Fi network, displaying a registration web portal at the mobile device, the registration web portal allowing a user to provision the SIM for receiving service from the wireless network provider.

2. The method of claim 1, further comprising allowing the mobile device to access the service upon provisioning through the displayed registration web portal.

3. The method of claim 1, wherein determining whether the SIM of the mobile device is associated with a wireless network provider includes determining whether first six digits of an international mobile subscriber identity number (IMSI) of the SIM are associated with the wireless network provider.

4. The method of claim 1, wherein sending the attachment request includes sending an attachment request to the wireless data network of the wireless network provider when the mobile device is within a Long Term Evolution (LTE) coverage area of the wireless data network.

5. The method of claim 1, further comprising displaying a user interface on the mobile device to obtain user permission to proceed with user registration through the displayed registration web portal.

6. The method of claim 1, wherein the particular error code indicates that evolved packet system (EPS) and non-EPS services are unavailable.

7. The method of claim 1, further comprising allowing a user to select a data plan for purchase using the registration web portal.

8. The method of claim 1, further comprising: upon determining the mobile device is connected to the Wi-Fi network, obtaining parameters including an international mobile equipment identity (IMEI) of the mobile device and an international mobile subscriber identity number (IMSI) of the SIM; and
   storing the IMSI and the IMEI at a Home Subscriber Server (HSS) upon completion of user registration through the displayed registration web portal.

9. A mobile device, comprising:
   a communication interface configured to enable communication via a mobile network;
   a processor coupled with the communication interface;
   a storage device accessible to the processor; and
   an executable program in the storage device, wherein execution of the program by the processor configures the mobile device to perform functions, including functions to:
   detect power up of a mobile device equipped with a Subscriber Identification Module (SIM);
   determine whether the SIM of the mobile device is associated with a wireless network provider;
   upon determining the SIM of the mobile device is associated with the wireless network provider, send an attachment request to a wireless data network of the wireless network provider when the mobile device is within a coverage area of the wireless data network;
   receive an attachment response from the wireless data network of the wireless network provider in response to the attachment request;
   determine from the attachment response, whether attachment to the wireless data network of the wireless network provider is successful;

upon determining the attachment is not successful, review an error code provided by the wireless network provider;

based on the error code, determine whether the SIM is not provisioned for receiving service from the wireless network provider;

upon determining the SIM is not provisioned for receiving service from the wireless network provider, determine if the mobile device is connected to a Wi-Fi network; and upon determining the mobile device is connected to the Wi-Fi network, display a registration web portal at the mobile device, the registration web portal allowing a user to provision the SIM for receiving service from the wireless network provider.

10. The mobile device of claim 9, wherein execution of the program by the processor configures the mobile device to perform functions, including functions to:

allow the mobile device to access the service upon provisioning through the displayed registration web portal.

11. The mobile device of claim 9, wherein execution of the program by the processor configures the mobile device to perform functions, including functions to:

determine whether first six digits of an international mobile subscriber identity number (IMSI) of the SIM are associated with the wireless network provider.

12. The mobile device of claim 9, wherein execution of the program by the processor configures the mobile device to perform functions, including functions to:

send an attachment request to the wireless data network of the wireless network provider when the mobile device is within a Long Term Evolution (LTE) coverage area of the wireless data network.

13. The mobile device of claim 9, wherein execution of the program by the processor configures the mobile device to perform functions, including functions to:

display a user interface on the mobile device to obtain user permission to proceed with user registration through the displayed registration web portal.

14. The mobile device of claim 9, wherein the particular error code indicates that evolved packet system (EPS) and non-EPS services are unavailable.

15. The mobile device of claim 9, wherein execution of the program by the processor configures the mobile device to perform functions, including functions to:

allow a user to select a data plan for purchase using the registration web portal.

16. The mobile device of claim 9, wherein execution of the program by the processor configures the mobile device to perform functions, including functions to:

upon determining the mobile device is connected to the Wi-Fi network, obtain parameters including an international mobile equipment identity (IMEI) of the mobile device and an international mobile subscriber identity number (IMSI) of the SIM; and store the IMSI and the IMEI at a Home Subscriber Server (HSS) upon completion of user registration through the displayed registration web portal.

17. A non-transitory computer-readable medium comprising instructions which, when executed by one or more computers, cause the one or more computers to:

detect power up of a mobile device equipped with a Subscriber Identification Module (SIM);

determine whether the SIM of the mobile device is associated with a wireless network provider;

upon determining the SIM of the mobile device is associated with the wireless network provider, send an attachment request to a wireless data network of the wireless network provider when the mobile device is within a coverage area of the wireless data network;

receive an attachment response from the wireless data network of the wireless network provider in response to the attachment request;

determine from the attachment response, whether attachment to the wireless data network of the wireless network provider is successful;

upon determining the attachment is not successful, review an error code provided by the wireless network provider;

based on the error code, determine whether the SIM is not provisioned for receiving service from the wireless network provider;

upon determining the SIM is not provisioned for receiving service from the wireless network provider, determine if the mobile device is connected to a Wi-Fi network; and upon determining the mobile device is connected to the Wi-Fi network, display a registration web portal at the mobile device, the registration web portal allowing a user to provision the SIM for receiving service from the wireless network provider.

18. The computer-readable medium of claim 17 further comprising instructions which, when executed by the one or more computers, cause the one or more computers to:

allow the mobile device to access the service upon provisioning through the displayed registration web portal.

19. The computer-readable medium of claim 17 further comprising instructions which, when executed by the one or more computers, cause the one or more computers to:

determine whether first six digits of an international mobile subscriber identity number (IMSI) of the SIM are associated with the wireless network provider.

20. The computer-readable medium of claim 17 further comprising instructions which, when executed by the one or more computers, cause the one or more computers to:

send an attachment request to the wireless data network of the wireless network provider when the mobile device is within a Long Term Evolution (LTE) coverage area of the wireless data network.

* * * * *